April 6, 1948.                M. N. YARDENY                 2,439,329
                ELECTRIC CONTROL APPARATUS FOR RAPIDLY PLACING
                          A LOAD IN ANY DESIRED POSITION
                              Filed Oct. 11, 1945
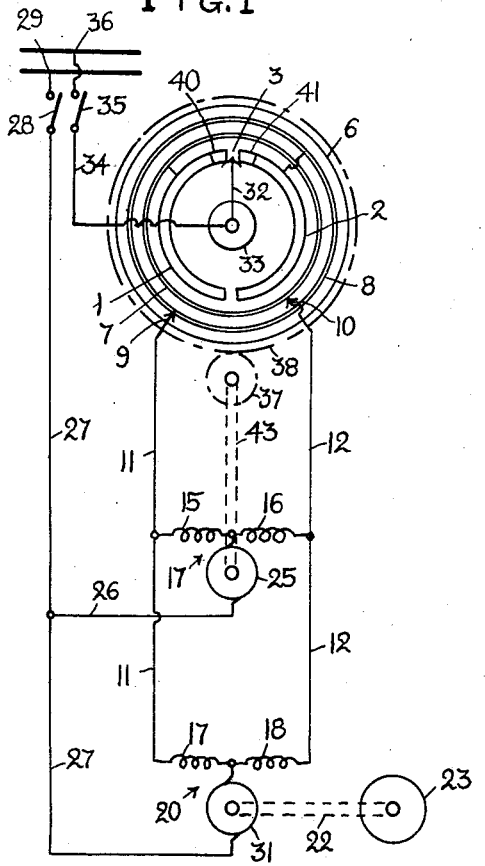
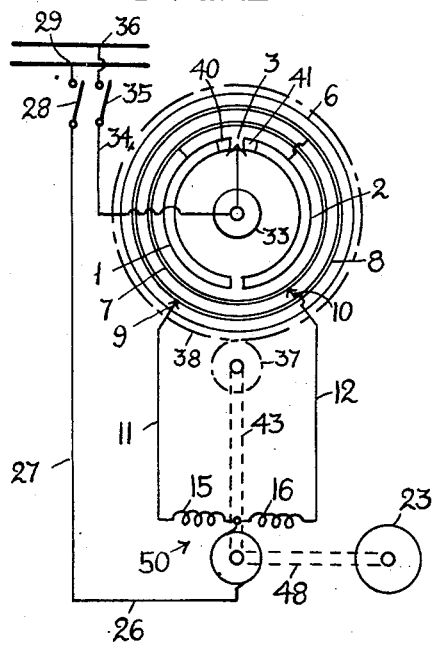
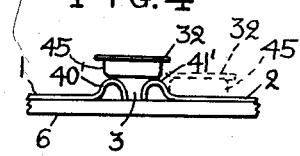
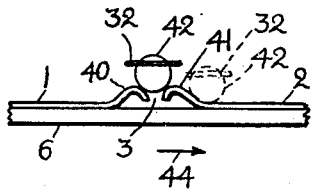
MICHEL N. YARDENY
INVENTOR.
BY
*Fredwick E. Ham*
ATTORNEY Patented Apr. 6, 1948

2,439,329

UNITED STATES PATENT OFFICE 2,439,329

ELECTRIC CONTROL APPARATUS FOR RAPIDLY PLACING A LOAD IN ANY DESIRED POSITION

Michel N. Yardeny, New York, N. Y.

Application October 11, 1945, Serial No. 621,792

7 Claims. (Cl. 318—297)

This invention relates to electric control apparatus, for controlling an electric motor for placing a load operated by the motor in any desired position, and has particular reference to control apparatus employing independently movable control members, one of which comprises a pair of electrically conducting means separated by a gap and moved by drive means, and the other comprises a contact arm engaging the conducting members and arranged to be operated manually or by other means, the control member controlling directional rotation of the load motor, and stopping the load motor when the gap is brought in alignment with the contact arm.

The main object of this invention is to provide means to yieldably lock the two members together in an operative position, i. e. with the contact arm engaging one of the conducting means, for causing the load motor to rotate continuously at full speed until the desired position of the load is approached, whereupon the manually or otherwise operable element is detained for allowing the gap and the contact arm to be moved into alignment, thereby stopping the load motor in the desired position of the load.

Such an arrangement has the advantage that the load may be moved through any desired number of revolutions or desired distance, faster and/or more conveniently than it is possible by manual operation of one of the control members.

Another object of this invention is to provide means to stop the load accurately in the desired position by preventing hunting or oscillations of the load motor when the contact arm overruns the gap by inertia, thereby causing the renewed motor operation in reversed direction.

The foregoing and other objects and features of this invention are more fully described in the accompanying specification and drawing in which:

Fig. 1 is a diagrammatic view of a control system according to the invention;

Fig. 2 is a similar view of a modified control system according to the invention;

Fig. 3 is a detail view of an embodiment of control members employed in a control system according to this invention; and Fig. 4 is a similar view of another embodiment of the control members.

The invention as shown in Fig. 1 comprises a pair of control members at a control point, one member comprising a pair of electrically conducting elements, shown as segments 1 and 2, separated by a gap 3 and mounted for rotation on an insulation disc 6. The segments are connected to collector rings 7, 8, respectively, engaged by contact brushes 9, 10 connected by leads 11, 12, respectively, to reversing field windings 17, 18, respectively, of a load motor 20 operatively connected as by a shaft 22 to a load 23. The windings 15, 16 are connected together, and the common point thereof is connected to one terminal of armature 25 of the pilot motor, the other armature terminal being connected by a lead 26 to a lead 27 which is connected through a switch 28 to a terminal 29 of a source of current. The windings 17, 18 are also connected together and the common point thereof is connected to one terminal of armature 31, the other armature terminal being connected to the supply lead 27.

The second control member comprises a resilient contact arm 32 slidably engaging the segments 1, 2 and having a knob 33 for manual rotation of the contact arm, directly or through a gear. The arm 32 is connected by a lead 34 through a switch 35 to the other terminal 36 of the source of current. The disc 6 is connected by gears 36, 37 or a similar transmission to a shaft 43 of pilot motor 17. The electrical connections to the pilot motor are so arranged that when the contact arm 32 is moved to engage one of the segments 1 or 2, the pilot motor is energized for rotation in one or the other direction to bring the gap 3 into alignment with the contact arm 32, whence contact arm 32 will bridge gap 3, simultaneously energizing both motor windings and stopping the motor.

Thus, for instance, if the contact arm 32 is turned to the right in Fig. 1 for engaging the segment 2, then both the motors will be energized, provided switches 28, 35 are closed. The circuit for the motors can be traced as follows: From the terminal 36 of the source of current and the supply lead 34, through the contact arm 32, segment 2, ring 8, brush 9, lead 11, to windings 15 and 17, armatures 25 and 31, and leads 26 and 27, back to the source of current. Both the motors will be energized, and the pilot motor will rotate in a direction for causing the gap 3 to follow the arm 32 until the gap is bridged by the arm, thereby stopping both the motors by field opposition.

For moving the load conveniently through a more or less large distance before bringing it to the selected final position, the engaged segment 1 or 2 is temporarily and yieldably locked together with the contact arm 32, thereby causing the motors 17, 20 rapidly to rotate until the manually operable member 32 is stopped. The segments 1, 2 are provided for this purpose with raised portions 40, 41 shown in detail in Fig. 3. The contact arm 32 is provided with a ball-shaped contact element 42 at the end, slidably engaging the segments 1 and 2. The raised portions serve the purpose of allowing the pilot motor rapidly to rotate the contact arm and the segments together causing the load motor to advance the load continuously faster and more conveniently than by hand to the final position. For this purpose contact arm 32 is placed in a position abutting against one of the raised portions 40, 41 as shown in dotted lines in Fig. 3, in which position it will be held by the resiliency of arm 32.

If manual control of knob 33 is now relinquished, the contact arm will be dragged along by the disc 6 rotating in the direction of arrow 44. Both the motors will continue rotation until manual control of knob 33 is resumed for arresting further rotation of the knob, thereby allowing the gap 3 to align itself with contact ball 42, whereupon both the motors will be stopped, as previously described. As will be seen from Fig. 3, the downwardly bent tips of raised portions 40, 41 end above the disc, so that they are capable of yielding under the pressure of the resilient contact arm. The ball-shaped contact will be yieldably held in the gap 3 between the raised portions, thereby allowing the motors to be finally stopped without reversing them, thus eliminating hunting of the motors.

A modified contact element 45 is shown in Fig. 4, the contact being therein in the form of a block of a length substantially greater than the width of the gap so that the contact can be moved to a certain extent in either direction over the gap while retaining the bridging position in which both the motors are stopped. In this embodiment, the tips of the raised portions 40', 41' abut against disc 6, so that they are practically rigid.

A simplified system is shown in Fig. 2 in which, there is provided only one motor 50 directly connected by a shaft 48 to a load 23. Such an arrangement may be used when it is possible or desirable to locate the control members near the load.

The operation of the system is obvious from the previous description and it is evident that in such a system the position of the contact arm will always correspond to the position of the load.

I claim:

1. A control apparatus comprising a pair of relatively movable control members; a motor operatively connected to one of the members, the second member being movable by other means; one member comprising electrically conducting means, the other member comprising a contact arm for engaging the conducting means; circuit means to energize the motor when the contact arm engages the conducting means for causing the motor to rotate and to stop when the contact arm and the conducting means reach a predetermined relative position; and means capable of yieldably retaining the contact arm in engagement with the conducting means in a position other than said predetermined relative position until the second member is arrested, thereby causing the motor driven member to be placed in a position in which the contact arm and the conducting means occupy said predetermined relative position, thus stopping the motor.

2. A control apparatus comprising a pair of relatively movable control members; a motor operatively connected to one of the members, the second member being movable by other means; one member comprising a pair of electrically conducting members separated by a neutral point, the other member comprising a contact arm for engaging the conducting members; circuit means to energize the motor when the contact arm engages one or the other of the conducting members for causing the motor to rotate in one or the other direction and to stop when the contact arm reaches the neutral point; and means capable of yieldably retaining the contact arm in engagement with one or the other of the conducting members for causing the motor to rotate the conducting members and the contact arm simultaneously until the second member is arrested, thereby causing the motor driven member to be placed in a position in which the contact arm is aligned with the neutral point, thus stopping the motor.

3. A control apparatus comprising a pair of independently movable control members; a motor operatively connected to one of the members, the other member being manually movable; one member comprising a pair of electrically conducting members separated by a gap, the other member comprising a contact arm engaging the conducting members; circuit means to energize the motor when the contact arm engages one or the other of the conducting members for causing the motor to rotate in one or the other direction and to stop when the contact arm reaches the gap; and detent means on the conducting members for yieldably retaining the contact arm in engagement with one or the other of the conducting members for causing the motor to rotate the conducting members and the contact arm simultaneously until the manually operable member is manually stopped, thereby causing the motor driven member to be placed in a position in which the contact arm is registered with the gap, thus stopping the motor.

4. A control apparatus comprising a pair of independently movable control members; a motor operatively connected to one of the members, the other member being manually movable; one member comprising a pair of electrically conducting members separately by a gap, the other member comprising a contact arm engaging the conducting members; and circuit means to energize the motor when the contact arm engages one or the other of the conducting members for causing the motor to rotate in one or the other direction and to stop when the contact arm reaches the gap, said conducting members having raised portions at the gap for yieldably retaining the contact arm in engagement with one or the other of the conducting members at the outer side of the corresponding raised portion, thereby causing the motor to simultaneously move both members until the manually operable member is manually prevented from movement until the gap is reached by the contact arm, thereby causing the motor to be stopped.

5. A control apparatus comprising a pair of relatively movable control members; a motor operatively connected to one of the members, the second member being movable by other means; one member comprising a pair of electrically conducting members separated by a neutral point, the other member comprising a contact arm for engaging the conducting members; and circuit means to energize the motor when the contact arm engages one or the other of the conducting members for causing the motor to rotate in one or the other direction and to stop when the contact arm reaches the gap, the conducting members having raised portions at the gap for yieldably retaining the contact arm in engagement with one or the other of the conducting members at the outer side of the corresponding raised portion, thereby causing the motor to simultaneously move both members until the manually operable member is manually prevented from movement, thereby causing alignment of gap and contact arm, thus causing the motor to be stopped.

6. A control apparatus comprising a pair of relatively movable control members, one member comprising an electrically conducting means, the second member comprising a contact element for engaging the conducting means; drive means for moving one of the control members, the second control member being movable by other means; a motor adapted to operate a useful load; and means to energize the drive means and the motor for movement in response to an engagement between the contact element and the conducting means and to stop the drive means and the motor in response to the contact element being disengaged from the conducting means; and means capable of yieldably retaining the contact element in engagement with the conducting means for causing the drive means to simultaneously move both, the contact element and the conducting means until the second member is arrested, thereby causing the control member driven by the drive means to be placed in a position in which the contact element is disengaged from the conducting means, thus stopping the motor.

7. A control apparatus comprising a pair of relatively movable control members, one member comprising a pair of electrically conducting elements separated by a gap, the other member comprising a contact element for engaging the conducting elements; drive means for moving one of the control members, the other control member being manually movable; a motor adapted to operate a useful load; and means to control the directional movement of the drive means and the motor by the position of the contact element one or the other side of the gap and to stop the drive means and the motor in response to the contact element reaching the gap, said conducting elements having raised portions for yieldably retaining the contact element in engagement with one or the other of the conducting elements, thereby causing the drive means to simultaneously move both members until the manually operable member is manually prevented from movement, thereby causing alignment of gap and contact element, thus causing the drive means and the motor to be stopped.

MICHEL N. YARDENY.

REFERENCES CITED

The following references are of record in the file of this patent:

UNITED STATES PATENTS

| Number | Name | Date |
| --- | --- | --- |
| 665,133 | Riggs | Jan. 1, 1901 |
| 1,490,436 | Schulz | Apr. 15, 1924 |
| 2,342,717 | Yardeny | Feb. 29, 1944 |